US009205363B2

(12) United States Patent
Yamada et al.

(10) Patent No.: US 9,205,363 B2
(45) Date of Patent: Dec. 8, 2015

(54) DUST COLLECTING HONEYCOMB FILTER

(71) Applicant: NGK Insulators, Ltd., Nagoya (JP)

(72) Inventors: Toshio Yamada, Nagoya (JP); Toshihiro Hirakawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/152,292

(22) Filed: Jan. 10, 2014

(65) Prior Publication Data

US 2014/0123612 A1 May 8, 2014

Related U.S. Application Data

(63) Continuation of application No. PCT/JP2013/068817, filed on Jul. 10, 2013.

(30) Foreign Application Priority Data

Oct. 19, 2012 (JP) .................... 2012-231511

(51) Int. Cl.
*B01D 39/14* (2006.01)
*B01D 39/06* (2006.01)
*B01D 39/20* (2006.01)
*B01D 24/00* (2006.01)
(Continued)

(52) U.S. Cl.
CPC .......... *B01D 46/2459* (2013.01); *B01D 46/247* (2013.01); *F01N 3/0222* (2013.01); *F01N 3/2828* (2013.01); *B01D 46/2466* (2013.01); *F01N 2260/18* (2013.01); *F01N 2330/30* (2013.01); *Y02T 10/20* (2013.01)

(58) Field of Classification Search
CPC ........... B01D 46/2451; B01D 46/2459; B01D 46/2492; B01D 2271/00; B01D 2271/02; B01D 46/0005; B01D 46/2422; F01N 2330/30; F01N 2350/02; F01N 2450/02; F01N 3/022; F01N 3/0211; C04B 38/0006
See application file for complete search history.

(56) References Cited

U.S. PATENT DOCUMENTS 4,350,664 A * 9/1982 Gaysert ...................... 422/179
5,080,953 A * 1/1992 Horikawa et al. ............ 428/116
(Continued)

FOREIGN PATENT DOCUMENTS

JP 03-169347 7/1991
JP 09-150024 6/1997
(Continued)

OTHER PUBLICATIONS

International Search Report, International Patent Application No. PCT/JP2013/068817, dated Oct. 11, 2013 (3 pages).
(Continued)

*Primary Examiner* — Amber Orlando
(74) *Attorney, Agent, or Firm* — Burr & Brown, PLLC

(57) ABSTRACT

A dust collecting honeycomb filter includes a honeycomb base material having porous partition walls to define and form a plurality of cells, and a flange section disposed on an outer periphery of the honeycomb base material and having porous flange partition walls to define and form "a plurality of flange cells extending in the same direction as in the cells". The flange section is formed so as to project outwardly from the outer periphery of the honeycomb base material, the partition walls and the flange partition walls are continuously connected without forming any boundaries therein, the flange section has flange plugging portions.

15 Claims, 6 Drawing Sheets

(51) Int. Cl.
  *B01D 50/00* (2006.01)
  *B01D 46/24* (2006.01)
  *F01N 3/022* (2006.01)
  *F01N 3/28* (2006.01)

(56) References Cited

U.S. PATENT DOCUMENTS

| | | | | |
|---|---|---|---|---|
| 5,149,475 | A * | 9/1992 | Horikawa et al. | 264/630 |
| 5,603,742 | A * | 2/1997 | Nagashima et al. | 55/502 |
| 5,656,245 | A * | 8/1997 | Fujisawa et al. | 422/179 |
| 5,720,787 | A * | 2/1998 | Kasai et al. | 55/282 |
| 7,297,175 | B2 * | 11/2007 | Miwa | 55/523 |
| 7,972,677 | B2 * | 7/2011 | Ichikawa et al. | 428/116 |
| 2002/0068025 | A1 * | 6/2002 | Foster et al. | 422/179 |
| 2004/0065068 | A1 * | 4/2004 | Otsubo et al. | 55/523 |
| 2004/0096625 | A1 * | 5/2004 | Hijikata | 428/116 |
| 2005/0120691 | A1 | 6/2005 | Miwa | |
| 2005/0210848 | A1 * | 9/2005 | Kuki et al. | 55/523 |
| 2009/0238733 | A1 * | 9/2009 | Ohno et al. | 422/180 |

FOREIGN PATENT DOCUMENTS

| | | |
|---|---|---|
| JP | 2001-079320 | 3/2001 |
| JP | 2001-314718 | 11/2001 |
| JP | 2002-200409 | 7/2002 |
| JP | 2002-336620 | 11/2002 |
| JP | 2003-269132 | 9/2003 |
| JP | 2010-184218 | 8/2010 |

OTHER PUBLICATIONS

Extended European Search Report (Application No. 13814815.0) dated May 8, 2015.

* cited by examiner

DUST COLLECTING HONEYCOMB FILTER

BACKGROUND OF THE INVENTION

1. Field Of The Invention

The present invention relates to a dust collecting honeycomb filter. More particularly, it relates to a dust collecting honeycomb filter which can suppress damage of a flange section due to collision or the like during handling or the like.

2. Description Of Related Art

Heretofore, as a filter element of a dust collecting device, there has been used a filter of a honeycomb form (a dust collecting honeycomb filter) having a honeycomb base material having plugging portions, and a flange section formed on an outer periphery of the honeycomb base material (e.g., see Patent Document 1).

Moreover, there has been disclosed a honeycomb structure including an inner tube portion of a honeycomb form, and an outer tube portion of a honeycomb form formed on an outer periphery of the inner tube portion (e.g., see Patent Document 2). In Patent Document 2, it is described that the inner tube portion and the outer tube portion are integrally formed, when a formed honeycomb body (a honeycomb structure prior to firing) is formed by extrusion forming.

Furthermore, as the dust collecting honeycomb filter, there has been disclosed a filter of a honeycomb form having a honeycomb base material (a main body) having plugging portions, and a flange section formed on an outer periphery of the honeycomb base material (e.g., see Patent Document 3). In Patent Document 3, it is described that the filter of the honeycomb form can be prepared by an integral forming method which is a manufacturing method of integrally forming a main body portion and a flange portion, followed by firing.

In Patent Document 2, the inner tube portion and the outer tube portion are integrally formed to prepare the inner tube portion of the honeycomb form and the outer tube portion of the honeycomb form, and hence it is presumed that the flange section of the filter described in Patent Document 3 also has the honeycomb form.

In such a dust collecting honeycomb filter as described above, the flange section is usually used to fix the honeycomb filter to a passage of a fluid. Furthermore, the flange section in the dust collecting honeycomb filter is also utilized as a grip portion (a portion to be gripped) during movement by a human hand or a robot, and a value of utilization other than the fixing (assembling) to the passage of the fluid also increases.

However, in the flange section in the dust collecting honeycomb filter, the problem has occurred that chips or cracks are generated due to mutual collision or contact of the flange sections, collision or contact of the flange section with another object, or the like during handling, during movement on a conveyer, or the like.

CITATION LIST

Patent Documents

[Patent Document 1] JP-A-H09-150024
[Patent Document 2] JP-A-2010-184218
[Patent Document 3] JP-A-2001-79320

SUMMARY OF THE INVENTION

Problem to be Solved by the Invention

Especially in a dust collecting honeycomb filter in which a thickness of partition walls is 250 μm or less, or a dust collecting honeycomb filter in which a diameter of a cross section perpendicular to a cell extending direction is 150 mm or more, there has been the problem that chips or cracks are easily generated.

It is to be noted that a honeycomb structure disclosed in Patent Document 2 has plugging portions disposed in a flange section, so that the generation of the chips or the cracks due to collision or contact can be decreased. However, the plugging portions are disposed in the flange section, which has caused the problem that when the honeycomb structure is used as a DPF, the cracks are generated in a root portion of the flange section of the honeycomb structure due to heat shock during recovery. It is to be noted that the DPF is an abbreviation for "a diesel particulate filter", and in the DPF, "the recovery" is performed which is an operation of removing collected particulate materials by burning or the like.

The present invention has been developed in view of the above-mentioned problem. An object of the present invention is to provide a dust collecting honeycomb filter which can suppress damage of the flange section due to the collision or the like during handling or the like.

Means for Solving the Problem

According to a first aspect of the present invention, a dust collecting honeycomb filter including a honeycomb base material having porous partition walls to define and form a plurality of cells that become through channels of a fluid is provided, and a flange section disposed on an outer periphery of the honeycomb base material and having porous flange partition walls to define and form a plurality of flange cells, wherein an extending direction of the cells of the honeycomb base material and an extending direction of the flange cells are the same direction, the flange section is formed so as to project outwardly from the outer periphery of the honeycomb base material, the partition walls and the flange partition walls are continuously connected without forming any boundaries therein, the flange section has flange plugging portions disposed in open frontal areas of the flange cells in both end surfaces in the extending direction of the flange cells, a length, in the extending direction of the flange cells, of the flange plugging portion positioned on the innermost side in the flange section is from 1.0 to 2.5 mm, and a length, in the extending direction of the flange cells, of the flange plugging portion positioned on the outermost side in the flange section is 3.0 mm or more.

According to a second aspect of the present invention, the dust collecting honeycomb filter according to the first aspect is provied, wherein a length, in the extending direction of the flange cells, of the flange plugging portion positioned on the outermost side in the flange section is 7.0 mm or less.

According to a third aspect of the present invention, the dust collecting honeycomb filter according to the first or second aspects is provided, wherein as to the length of the flange plugging portion in the extending direction of the flange cells, the flange plugging portion positioned on an inner side in the flange section is shorter.

According to a fourth aspect of the present invention, the dust collecting honeycomb filter according to any one of the first to third aspects is provided, wherein the honeycomb base material has the plugging portions disposed in open frontal areas of at least a part of the cells.

According to a fifth aspect of the present invention, the dust collecting honeycomb filter according to any one of the first to fourth aspects is provided, wherein the outer periphery of the honeycomb base material and the surface of the flange section include an outer periphery coating wall.

According to a sixth aspect of the present invention, the dust collecting honeycomb filter according to the first aspect is provided, wherein a material of the outer periphery coating wall and a material of the flange plugging portions are the same material.

SUMMARY OF THE INVENTION

In a dust collecting honeycomb filter of the present invention, a length, in an extending direction of flange cells, of a flange plugging portion positioned on the innermost side in a flange section is from 1.0 to 2.5 mm. Moreover, a length, in the extending direction of the flange cells, of a flange plugging portion positioned on the outermost side in the flange section is 3.0 mm or more. Therefore, during handling of the dust collecting honeycomb filter, during moving of the dust collecting honeycomb filter on a conveyer, or the like, it is possible to prevent generation of chips or cracks due to mutual collision or contact of the flange sections, collision or contact of the flange section with another object, or the like. This is especially because the length, in the extending direction of the flange cells, of the flange plugging portion positioned on the outermost side in the flange section is as large as 3.0 mm or more, and the flange plugging portion has a structure strong against the collision or the like. Moreover, when the dust collecting honeycomb filter of the present invention is used as a DPF, it is possible to prevent generation of cracks of a root portion of the flange section of the dust collecting honeycomb filter due to heat shock during recovery. This is especially because the length, in the extending direction of the flange cells, of the flange plugging portion positioned on the innermost side in the flange section is in a range of 1.0 to 2.5 mm, and hence a difference in temperature between the outermost periphery of the honeycomb base material and the innermost portion of the flange section is not easily made.

DETAILED DESCRIPTION OF THE INVENTION

Figure 1:
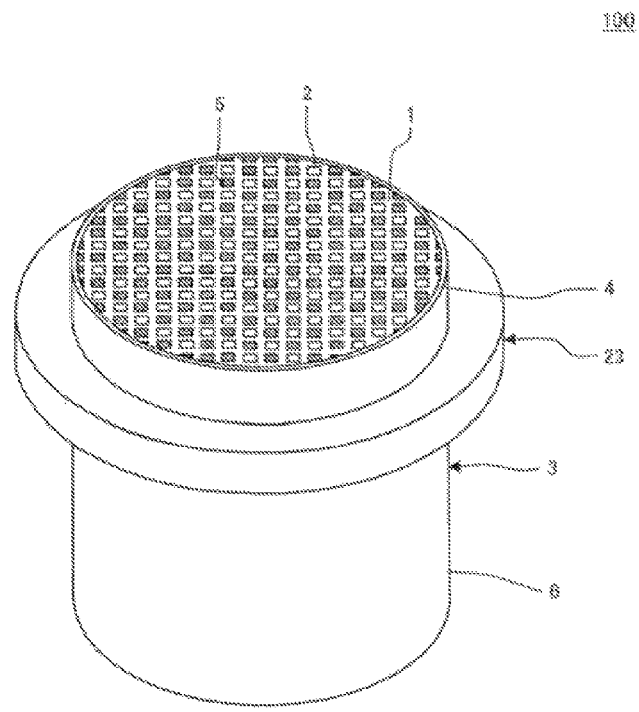
FIG. 1 is a perspective view schematically showing one embodiment of a dust collecting honeycomb filter of the present invention.

Hereinafter, modes for carrying out the present invention will specifically be described with reference to the drawings. The present invention is not limited to embodiments in the following. It should be understood that changes, improvements and the like suitably added to the embodiments in the following on the basis of ordinary knowledge of a person skilled in the art without departing from the gist of the present invention also fall in the scope of the present invention.

(1) Dust Collecting Honeycomb Filter:

One embodiment of the dust collecting honeycomb filter of the present invention includes a honeycomb base material 3, and a flange section 23 disposed on an outer periphery 4 of the honeycomb base material 3, as shown in FIG. 1 to FIG. 4. The honeycomb base material 3 has porous partition walls 1 to define and form a plurality of cells 2 that become through channels of a fluid. The flange section 23 has porous flange partition walls 21 to define and form a plurality of flange cells 22. Moreover, an extending direction D1 of the cells 2 of the honeycomb base material 3 and an extending direction D2 of the flange cells 22 are the same direction. Furthermore, the flange section 23 is formed so as to project outwardly from the outer periphery 4 of the honeycomb base material 3. Additionally, the partition walls 1 and the flange partition walls 21 are continuously connected without forming any boundaries therein. Moreover, the flange section 23 has flange plugging portions 24 disposed in open frontal areas of the flange cells in both end surfaces (end surfaces 25 and 25 of the flange section) in the extending direction D2 of the flange cells 22. Furthermore, a length, in the extending direction D2 of the flange cells 22, of a flange plugging portion 24a positioned on the innermost side in the flange section 23 is from 1.0 to 2.5 mm. Additionally, a length, in the extending direction D2 of the flange cells 22, of a flange plugging portion 24b positioned on the outermost side in the flange section 23 is 3.0 mm or more.

Figure 2:
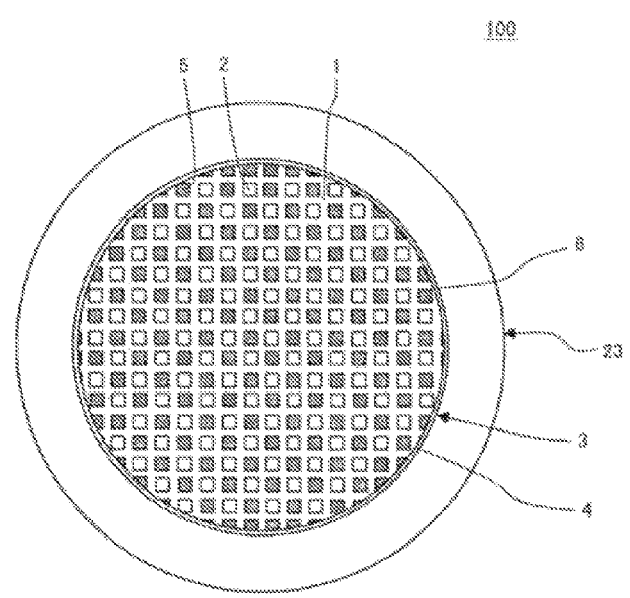
FIG. 2 is a plan view schematically showing the one embodiment of the dust collecting honeycomb filter of the present invention.
Figure 3:
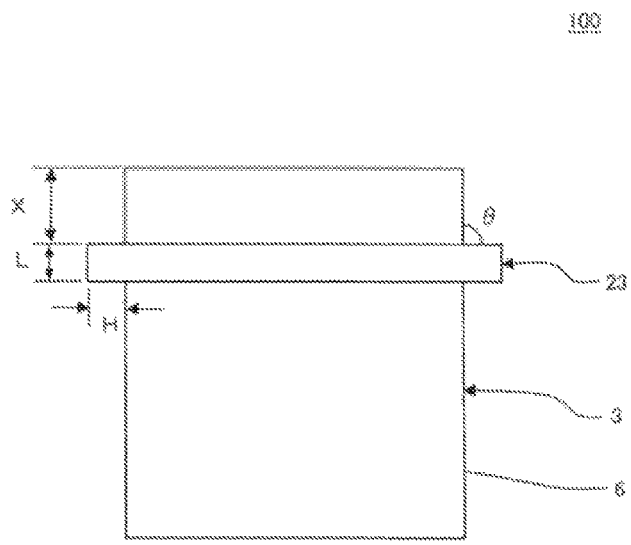
FIG. 3 is a front view schematically showing the one embodiment of the dust collecting honeycomb filter of the present invention.
Figure 4:
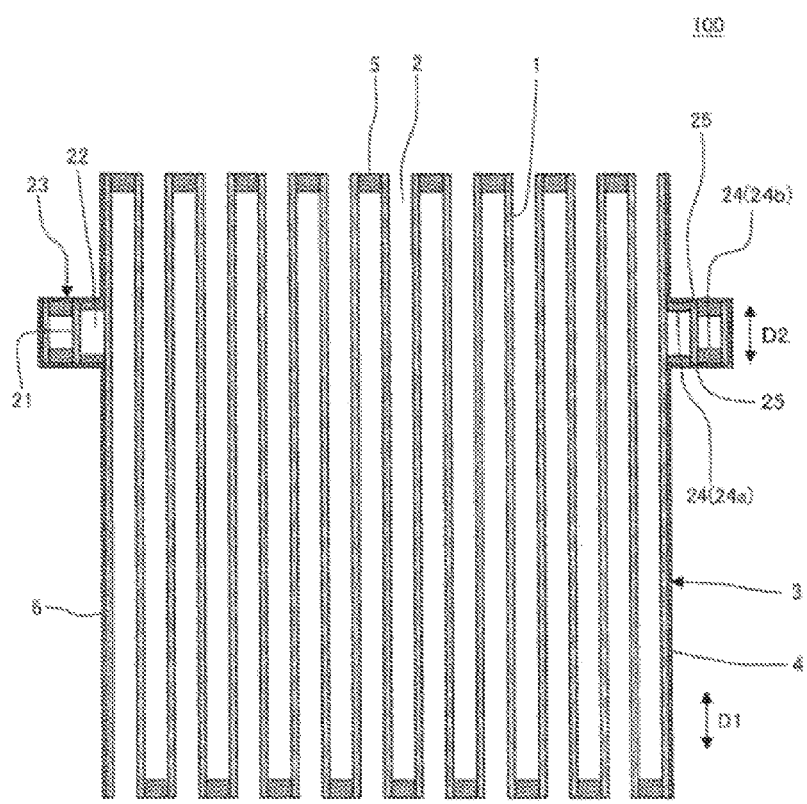
FIG. 4 is a schematic view showing a cross section of the one embodiment of the dust collecting honeycomb filter of the present invention which is parallel to a cell extending direction.

FIG. 1 is a perspective view schematically showing one embodiment of a dust collecting honeycomb filter of the present invention. FIG. 2 is a plan view schematically showing the one embodiment of the dust collecting honeycomb filter of the present invention. FIG. 3 is a front view schematically showing the one embodiment of the dust collecting honeycomb filter of the present invention. FIG. 4 is a schematic view showing a cross section of the one embodiment of the dust collecting honeycomb filter of the present invention which is parallel to a cell extending direction.

A dust collecting honeycomb filter 100 of the present embodiment has such a constitution as described above. Therefore, in the dust collecting honeycomb filter 100, it is possible to prevent generation of chips or cracks due to mutual collision or contact of the flange sections 23, collision or contact of the flange section with another object, or the like "during handling, during moving of the dust collecting honeycomb filter 100 on a conveyor, or the like". This is especially because the length, in the extending direction D2 of the flange cells 22, of the flange plugging portion 24b positioned on the outermost side in the flange section 23 is as large as 3.0 mm or more, and the flange plugging portion has a structure strong against the collision or the like. Moreover, the dust collecting honeycomb filter 100 of the present embodiment can be used as a DPF, but in this case, it is possible to prevent generation of cracks in a root portion of the flange section 23 of the dust collecting honeycomb filter 100 due to heat shock during recovery. This is especially because the length, in the extending direction D2 of the flange cells 22, of the flange plugging portion 24a positioned on the innermost side of the flange section 23 is in a range of 1.0 to 2.5 mm, and hence a difference in temperature between the outermost periphery of the honeycomb base material and the innermost portion of the flange section is not easily made.

In the dust collecting honeycomb filter 100 of the present embodiment, the honeycomb base material 3 has the porous partition walls 1 to define and form the plurality of cells 2 that become the through channels of the fluid. A material of the honeycomb base material preferably contains, as a main component, at least one selected from the group consisting of cordierite, silicon carbide, mullite, aluminum titanate, zeolite, vanadium and alumina. Moreover, the material of the honeycomb base material is further preferably at least one selected from the group consisting of cordierite, silicon carbide, mullite, aluminum titanate, zeolite, vanadium and alumina (may include inevitably contained impurities). Here, "the main component" means a component in excess of 50 mass % of the whole material.

In the dust collecting honeycomb filter 100 of the present embodiment, an average pore diameter of the partition walls 1 is preferably from 5 to 100 µm, and especially preferably from 8 to 50 µm. When the average pore diameter is smaller than 5 µm, a pressure loss increases sometimes. When the average pore diameter is larger than 100 µm, a strength of the dust collecting honeycomb filter lowers sometimes. The average pore diameter is a value measured by a mercury porosimeter.

In the dust collecting honeycomb filter 100 of the present embodiment, a porosity of the partition walls 1 is preferably from 30 to 80%, and especially preferably from 35 to 75%. When the porosity is smaller than 30%, the pressure loss increases sometimes. When the porosity is larger than 80%, the strength of the dust collecting honeycomb filter 100 lowers sometimes. The porosity is a value measured by the mercury porosimeter.

A thickness of the partition walls 1 is preferably from 40 to 600 µm, and especially preferably from 150 to 400 µm. When the thickness is smaller than 40 µm, the strength of the dust collecting honeycomb filter 100 lowers sometimes. When the thickness is larger than 600 µm, the pressure loss rises sometimes.

In the dust collecting honeycomb filter 100 of the present embodiment, there is not any special restriction on a shape of the honeycomb base material 3. As the shape of the honeycomb base material 3, a cylindrical shape, a tubular shape whose end surfaces are elliptic, a tubular shape whose end surfaces have a polygonal shape "such as a square shape, a rectangular shape, a triangular shape, a pentangular shape, a hexagonal shape, or an octagonal shape", or the like is preferable. In the dust collecting honeycomb filter 100 shown in FIG. 1 to FIG. 4, the shape of the honeycomb base material 3 is the cylindrical shape.

In the dust collecting honeycomb filter 100 of the present embodiment, there is not any special restriction on a cell shape of the honeycomb base material 3 (the cell shape in a cross section perpendicular to a cell extending direction). Examples of the cell shape include a triangular shape, a quadrangular shape, a hexagonal shape, an octagonal shape, a round shape, and any combination of these shapes. In the quadrangular shape, a square shape or a rectangular shape is preferable.

In the dust collecting honeycomb filter 100 of the present embodiment, there is not any special restriction on a cell density of the honeycomb base material 3. The cell density of the honeycomb base material 3 is preferably from 15 to 200 cells/cm$^2$, and especially preferably from 30 to 100 cells/cm$^2$. When the cell density is lower than 15 cells/cm$^2$ and an exhaust gas is allowed to flow, the pressure loss increases in a short time, or the strength of the dust collecting honeycomb filter 100 lowers sometimes. When the cell density is higher than 200 cells/cm$^2$, the pressure loss increases sometimes.

In the dust collecting honeycomb filter 100 of the present embodiment, the honeycomb base material 3 has plugging portions disposed in open frontal areas of at least a part of the cells 2. Further specifically, the dust collecting honeycomb filter 100 of the present embodiment includes plugging portions 5 disposed in open frontal areas of predetermined cells (first cells) in one end surface and open frontal areas of the remaining cells (second cells) in the other end surface. Moreover, the first cells and the second cells are alternately arranged. Furthermore, checkered patterns are accordingly formed in both the end surfaces of the dust collecting honeycomb filter by the plugging portions 5 and "the open frontal areas of the cells". A material of the plugging portions 5 is preferably a material which is considered to be preferable as the material of the honeycomb base material (the partition walls). The material of the plugging portions 5 and the material of the honeycomb base material may be the same material, or different materials.

In the dust collecting honeycomb filter of the present invention, the plugging portions may be disposed in the open frontal areas "on a fluid inlet side" of the cells of a part of the honeycomb base material. Moreover, in the dust collecting honeycomb filter of the present invention, the plugging portions may be disposed in the open frontal areas "on a fluid outlet side" of the cells of a part of the honeycomb base material. Furthermore, in the dust collecting honeycomb filter of the present invention, the plugging portions do not have to be formed. When there are not any plugging portions or the number of the plugging portions is small, a collection efficiency deteriorates sometimes. However, the pressure loss lowers, and hence an engine output preferably goes up.

The dust collecting honeycomb filter 100 of the present embodiment includes the flange section 23 disposed on the outer periphery 4 of the honeycomb base material 3 and having the porous flange partition walls 21 to define and form the plurality of flange cells 22. Moreover, the flange section 23 has a shape projecting outwardly from the outer periphery 4 of the honeycomb base material 3. Moreover, in the dust collecting honeycomb filter 100 of the present embodiment, it can be considered that an outer shape of the flange section 23 is such a shape that a central portion of a disc (a column) is hollowed out. As shown in FIGS. 1 to 4, the flange section 23 is preferably formed in a ring shape extending in a peripheral direction of the outer periphery 4 of the honeycomb base material 3 (a continuous ring shape), but it is also a preferable configuration that the flange section is formed in "an intermittent ring shape" in which a part of the ring shape is missing.

The flange section 23 has the flange plugging portions 24 disposed in "the open frontal areas of the flange cells 22" in both end surfaces in the extending direction D2 of the flange cells 22 (one "end surface 25 of the flange section" and the other "end surface 25 of the flange section"). Moreover, the length, in the extending direction D2 of the flange cells 22, of the flange plugging portion 24a positioned on the innermost side in the flange section 23 is from 1.0 to 2.5 mm. When the length of the flange plugging portion 24a in the extending direction D2 of the flange cells 22 is smaller than 1.0 mm, the flange plugging portion 24a unfavorably easily drops due to vibration or the like during use. When the length is in excess of 2.5 mm and the dust collecting honeycomb filter 100 is used as the DPF, cracks are unfavorably generated in a root portion of the flange section 23 of the dust collecting honeycomb filter 100 due to the heat shock during the recovery.

Moreover, the length, in the extending direction D2 of the flange cells 22, of the flange plugging portion 24b positioned on the outermost side in the flange section 23 is 3.0 mm or more. Furthermore, the length of the flange plugging portion 24b in the extending direction D2 of the flange cells 22 is preferably from 3.0 to 7.0 mm. When the length of the flange plugging portion 24b in the extending direction D2 of the flange cells 22 is smaller than 3.0 mm, chips or cracks are unfavorably generated due to the mutual collision or the contact of the flange sections 23, the collision or the contact of the flange section 23 with the other object, or the like. Additionally, when the length of the flange plugging portion 24b in the extending direction D2 of the flange cells 22 is in excess of 7.0 mm, a long time is required for formation of the flange plugging portions sometimes.

As to the length (a flange plugging portion length) of the flange plugging portion 24 in the extending direction D2 of the flange cells 22, the flange plugging portion 24 positioned on an inner side in the flange section 23 is preferably shorter. That is, the flange plugging portion length preferably successively decreases stepwise from the flange plugging portion 24b positioned on the outermost side toward the flange plugging portion 24a positioned on the innermost side in the flange section 23. In consequence, impact force or heat stress can be scattered, and shock resistance and heat resistance can be enhanced.

The length in "the direction D2" of the flange plugging portion 24b positioned on the outermost side in the flange section 23 is preferably 1 mm or more larger than the length in "the direction D2" of the flange plugging portion 24a positioned on the innermost side in the flange section 23. Moreover, when the dust collecting honeycomb filter is used as the DPF, a length in "the direction D1" of the plugging portion of the honeycomb base material 3 is preferably 1.5 mm or more larger than the largest value of the length in "the direction D2" of the flange plugging portion of the flange section.

In the dust collecting honeycomb filter 100 of the present embodiment, the extending direction D1 of the cells 2 of the honeycomb base material 3 and the extending direction D2 of the flange cells 22 are the same direction. Moreover, the partition walls and the flange partition walls are continuously connected without forming any boundaries therein (hereinafter, this state is described as "the continuous connection between the partition wall and the flange partition wall" sometimes). This state means that in a cross section of a connecting portion between the partition wall and the flange partition wall (a cross section parallel to a direction from the partition wall toward the flange partition wall), there are not any boundaries between the partition wall and the flange partition wall, and a material has a uniform state from the partition wall toward the flange partition wall. That is, a state where the partition walls in the honeycomb base material 3 are connected to each other and a state where the partition walls are connected to the flange partition walls are the same, and it can be considered that in either state, the partition walls are continuously connected, and any boundaries are not formed therebetween. Moreover, it can be considered that the partition walls and the flange partition walls are integrally formed by the above-mentioned "continuous connection between the partition wall and the flange partition wall". For example, first, when a formed honeycomb body is formed from a forming raw material by extrusion forming, there is formed the formed honeycomb body including portions that become the partition walls and portions that become the flange partition walls. Then, after drying or after firing, grind processing is performed to form the honeycomb base material (the partition walls) and the flange section (the flange partition walls), so that the above-mentioned "continuous connection between the partition wall and the flange partition wall" can be formed.

In the dust collecting honeycomb filter 100 of the present embodiment, respective cell structures of the flange section 23 and the honeycomb base material 3 are preferably the same. Here, the cell structure means the cell density (cells/cm$^2$), the partition wall thickness (μm), and the cell shape (a cross sectional shape perpendicular to the cell extending direction). When the respective cell structures of the flange section 23 and the honeycomb base material 3 are the same, the formed honeycomb body including the portions corresponding to the flange section 23 and the honeycomb base material 3 is formed by the extrusion forming, and predetermined portions are ground and removed, whereby the dust collecting honeycomb filter can be prepared. Therefore, the dust collecting honeycomb filter can easily be manufactured.

A thickness (the thickness of the flange section=a length of a diametric direction) H of the flange section 23 in the cross section perpendicular to the extending direction of the cells 2 is from 1 to 30 mm, preferably from 3 to 25 mm, and especially preferably from 5 to 20 mm. When the thickness H of the flange section 23 in the cross section perpendicular to the extending direction of the cells 2 is smaller than 1 mm, the flange section is thin, and hence strength lowers sometimes. When the thickness is in excess of 30 mm, the flange section is not easily assembled to a piping line, or is not easily handled sometimes. It is to be noted that when an outer periphery coating wall is disposed in the dust collecting honeycomb filter 100. "the thickness H of the flange section 23 in the cross section perpendicular to the extending direction of the cells 2" is a thickness on the basis of a position of the surface of the outer periphery coating wall.

In the dust collecting honeycomb filter 100 of the present embodiment, both the end surfaces (25 and 25) of the flange section 23 in the extending direction of the cells 2 are perpendicular to the extending direction of the cells 2. In this way, the end surfaces 25 and 25 of the flange section are perpendicular to the extending direction of the cells 2, and hence the dust collecting honeycomb filter 100 is easily fixed to a passage of the fluid. Furthermore, the flange section 23 can easily be gripped by a human hand or a robot. Moreover, the flange section may be tapered so that both the end surfaces in the cell extending direction are not perpendicular to the cell extending direction, and a diameter of a tip of each of both the end surfaces (both the ends) in the cell extending direction is smaller. Both the end surfaces (both the ends) of the flange section in the cell extending direction are tapered, whereby damage of corners of the flange section (portions where the end surfaces come in contact with the side surfaces) can be suppressed.

In a flat surface including a central axis of the honeycomb base material, an angle θ between the end surface of the flange section and the side surface of the honeycomb base material is preferably from 90 to 150°, further preferably from 90 to 140°, and especially preferably from 90 to 135°. Furthermore, the angle is most preferably from 90 to 130°. It is to be noted that the angle θ between the end surface of the flange section and the side surface of the honeycomb base material is 90°, when the end surface of the flange section is perpendicular to the cell extending direction.

Figure 9:
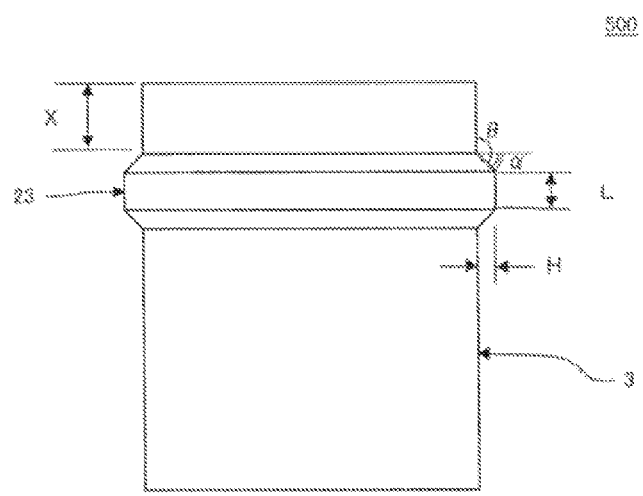
FIG. 9 is a front view schematically showing a dust collecting honeycomb filter of Example 3.

A width L of the flange section 23 is preferably from 1 to 90%, further preferably from 3 to 50%, and especially preferably from 5 to 30% of the length of the dust collecting honeycomb filter 100 in the cell extending direction. "The width L of the flange section" is the length of the flange section in the cell extending direction of the dust collecting honeycomb filter 100. When the width L of the flange section 23 is in the above range, the dust collecting honeycomb filter 100 can suitably be fixed to a limited space in a dust collector. Moreover, the flange section 23 is not excessively large, and hence the dust collecting honeycomb filter 100 can be lightened. When the percentage of the width L of the flange section 23 is smaller than it, the strength of the flange section lowers sometimes. When the percentage is in excess of 90%, the dust collecting honeycomb filter 100 enlarges, and there is the fear that the dust collecting honeycomb filter 100 cannot suitably be fixed to the limited space in the dust collector. It is to be noted that when the end of the flange section is tapered, "the width L of the flange section" is a distance between both tips of both tapered ends as shown in FIG. 9. It is to be noted that when the outer periphery coating wall is disposed in the dust collecting honeycomb filter 100, the width L of the flange section 23 is the thickness on the basis of the position of the surface of the outer periphery coating wall.

The flange section 23 may be disposed at any position of the honeycomb base material 3 in the extending direction of the cells 2. For example, the flange section may be disposed in the central portion of the honeycomb base material 3, may be disposed at the end thereof, or may be interposed between the central portion of the honeycomb base material 3 and the end thereof as shown in FIG. 1. It is to be noted that the central portion of the honeycomb base material is the central portion of the honeycomb base material in the cell extending direction.

Figure 5:
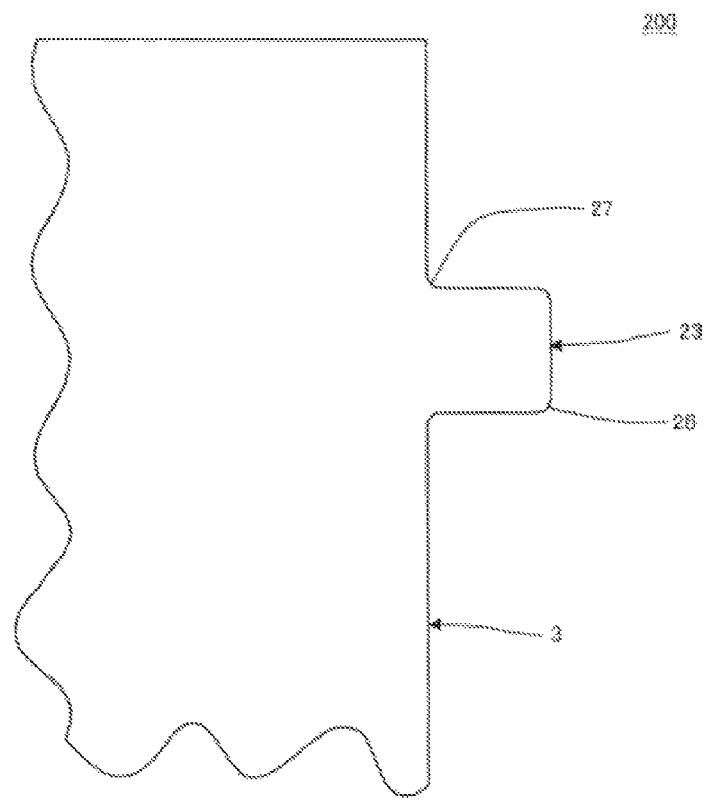
FIG. 5 is a schematic view showing a contour of a part of a cross section of another embodiment of the dust collecting honeycomb filter of the present invention which is parallel to a cell extending direction.

As shown in FIG. 5, in a flange section 23, corners on an outer side (on an outer peripheral side of the flange section) are preferably curved (an R-form) in a cross section including a central axis. Such a corner will be referred to as an R-form corner 26. The R-form corner 26 preferably has a circular shape. Moreover, a radius of a circle of the R-form corner 26 is preferably from 0.2 to 10 mm. The flange section has the R-form corner 26, whereby stress concentration can be suppressed, and damage of the dust collecting honeycomb filter can be suppressed.

Moreover, as shown in FIG. 5, in the flange section 23, a portion connected to a honeycomb base material on an inner side (an inner peripheral side of the flange section and a side connected to the honeycomb base material) preferably has a curvedly extended shape in the cross section including the central axis. This portion of the flange section 23 will be referred to as a curved skirt portion 27. The curved skirt portion 27 is preferably circular. Furthermore, a radius of the circle of the curved skirt portion 27 is preferably from 0.2 to 10 mm. The flange section has the curved skirt portion 27, whereby the stress concentration can be suppressed, and the damage of the dust collecting honeycomb filter can be suppressed. A dust collecting honeycomb filter 200 shown in FIG. 5 is another embodiment of the dust collecting honeycomb filter of the present invention. The dust collecting honeycomb filter 200 of the present embodiment preferably has the same constitution as the above-mentioned one embodiment of the dust collecting honeycomb filter of the present invention, except the above shape of the flange section 23.

Figure 6:
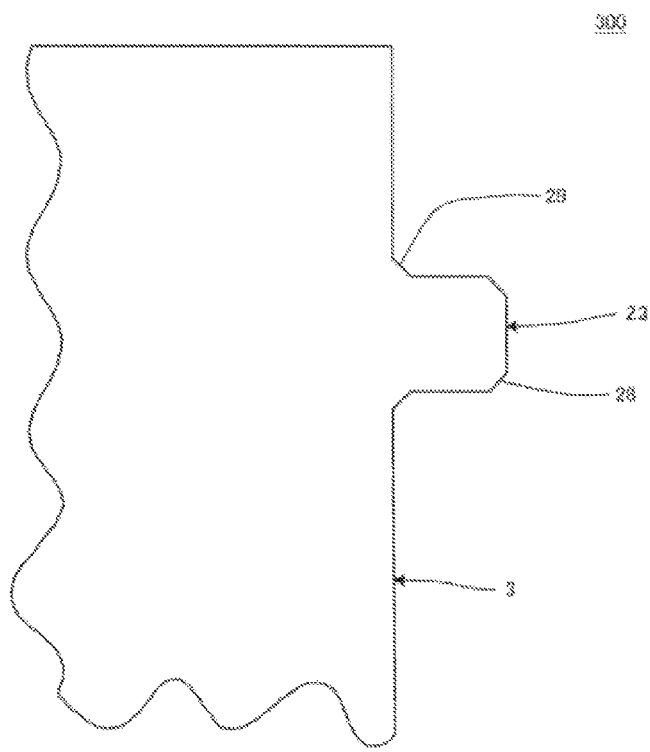
FIG. 6 is a schematic view showing a contour of a part of a cross section of still another embodiment of the dust collecting honeycomb filter of the present invention which is parallel to a cell extending direction.

Furthermore, as shown in FIG. 6, in a flange section 23, corners on an outer side (on an outer peripheral side of the flange section) are preferably linearly chamfered in a cross section including a central axis. Such a corner will be referred to as a linear corner 28. The flange section has the linear corner 28, whereby stress concentration can be suppressed, and damage of a dust collecting honeycomb filter can be suppressed. A dust collecting honeycomb filter 300 shown in FIG. 6 is still another embodiment of the dust collecting honeycomb filter of the present invention. The dust collecting honeycomb filter 300 of the present embodiment preferably has the same constitution as the above-mentioned one embodiment of the dust collecting honeycomb filter of the present invention, except the above shape of the flange section 23.

Additionally, as shown in FIG. 6, in the flange section 23, a portion connected to a honeycomb base material on an inner side (an inner peripheral side of the flange section and a side connected to the honeycomb base material) preferably has a linearly extended shape in the cross section including the central axis. This portion of the flange section 23 will be referred to as a linear skirt portion 29. The flange section has the linear skirt portion 29, whereby the stress concentration can be suppressed, and the damage of the dust collecting honeycomb filter can be suppressed.

In the dust collecting honeycomb filter 100, the outer periphery of the honeycomb base material 3 and the surface of the flange section 23 preferably include an outer periphery coating wall 6. A thickness of the outer periphery coating wall 6 is preferably from 0.05 to 3.0 mm, further preferably from 0.1 to 2.5 mm, and especially preferably from 0.2 to 2.0 mm. When the thickness is smaller than 0.05 mm, the outer periphery coating wall is excessively thin, and a mechanical strength of an outer periphery coating honeycomb structure lowers sometimes. When the thickness is larger than 3.0 mm, the outer periphery coating wall is excessively thick. For example, as compared with a size of the honeycomb structure which substantially functions as a filter layer or a catalyst carrier, the outer periphery coating honeycomb structure is excessively large sometimes.

A material of the outer periphery coating wall 6 is preferably a material obtained by adding additives such as an organic binder, resin balloons and a dispersant to "an inorganic raw material such as inorganic fiber, colloidal silica, clay or SiC particles" or "the same material as a plugging material described later" and further adding water, followed by kneading, or the like. The material of the outer periphery coating wall 6 and a material of flange plugging portions 24 are more preferably the same material. Furthermore, it is also a preferable configuration that a part of the outer periphery coating wall 6 is projected (inserted) into flange cells and that portions inserted into the flange cells are the flange plugging portions 24.

Figure 7:
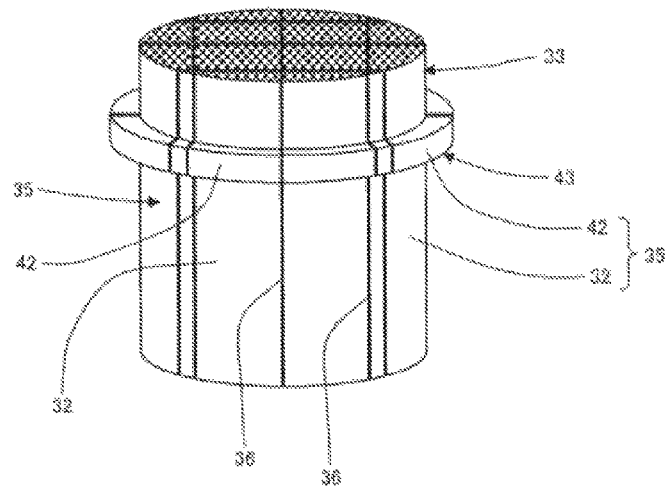
FIG. 7 is a perspective view schematically showing a further embodiment of the dust collecting honeycomb filter of the present invention.

A further embodiment of the dust collecting honeycomb filter of the present invention is such a segment type dust collecting honeycomb filter 400 as shown in FIG. 7. That is, the dust collecting honeycomb filter 400 of the present embodiment is the dust collecting honeycomb filter 400 including a plurality of honeycomb segments 35 each having a honeycomb segment base material 32 and a flange segment 42 disposed on the side surface of the honeycomb segment base material 32. A portion obtained by joining the plurality of honeycomb segment base materials 32 is a honeycomb base material 33. Moreover, a portion obtained by joining the plurality of flange segments 42 is a flange section 43. It is to be noted that the segment type dust collecting honeycomb filter 400 shown in FIG. 7 does not include an outer periphery coating wall, but it is also a preferable configuration that the filter includes the outer periphery coating wall.

The dust collecting honeycomb filter 400 of the present embodiment preferably has a constitution similar to one embodiment (the dust collecting honeycomb filter 100 (FIG. 1)) of the above-mentioned dust collecting honeycomb filter of the present invention, except a shape in which the plurality of honeycomb segments 35 are joined. Also in the dust collecting honeycomb filter 400 of the present embodiment, partition walls of the honeycomb segment base materials 32 and partition walls (flange partition walls) of the flange segments 42 are continuously connected without forming any boundaries therein. Therefore, in the connection between the honeycomb base material 33 and the flange section 43, the partition walls and the flange partition walls are continuously connected without forming any boundaries therein.

In the dust collecting honeycomb filter 400 of the present embodiment, the honeycomb segments 35 are joined to one another by a joining material 36. A thickness of the joining material 36 is preferably from 0.05 to 3.0 mm. Moreover, there is not any special restriction on a material of the joining material 36, and the material is preferably a ceramic material, and further preferably the same material as that of the honeycomb segment base materials 32.

(2) Manufacturing Method of Dust Collecting Honeycomb Filter:

The dust collecting honeycomb filter of the present invention can be manufactured by a method in the following. That is, the dust collecting honeycomb filter of the present invention can be manufactured by a method having a fired honeycomb body preparing step of preparing a fired honeycomb body, and a cutting step of cutting an outer peripheral portion of this fired honeycomb body to form the flange section. Furthermore, when the outer periphery coating wall is disposed, the method preferably has an outer periphery coating wall forming step, after cutting the outer peripheral portion of the fired honeycomb body. "The fired honeycomb body" is a fired honeycomb body including porous partition walls formed by firing a ceramic raw material, to define and form a plurality of cells that become through channels of a fluid.

Hereinafter, the manufacturing method of the dust collecting honeycomb filter of the present invention will be described every step.

(2-1) Fired Honeycomb Body Preparing Step;

The fired honeycomb body preparing step is a step of preparing the fired honeycomb body including the porous partition walls formed by firing the ceramic raw material. There is not any special restriction on a method of preparing the fired honeycomb body. Hereinafter, the fired honeycomb body preparing step will be described stepwise in divided steps.

(2-1-1) Forming Step;

First, in a forming step, a ceramic forming raw material containing the ceramic raw material is preferably formed to obtain the formed honeycomb body including partition walls (unfired) to define and form a plurality of cells that become through channels of a fluid. The formed honeycomb body is a formed body of a honeycomb structure.

The ceramic raw material to be contained in the ceramic forming raw material is preferably at least one selected from the group consisting of a cordierite forming raw material, cordierite, silicon carbide, a silicon-silicon carbide composite material, mullite, aluminum titanate, zeolite, and vanadium. It is to be noted that the cordierite forming raw material is the ceramic raw material blended so as to have a chemical composition in which silica falls in a range of 42 to 56 mass %, alumina falls in a range of 30 to 45 mass % and magnesia falls in a range of 12 to 16 mass %. Moreover, the cordierite forming raw material is fired to become cordierite.

Moreover, the ceramic forming raw material is preferably prepared by mixing the above ceramic raw material with a dispersion medium, an organic binder, an inorganic binder, a pore former, a surfactant and the like. There is not any special restriction on composition ratios of the respective raw materials, and the composition ratios are preferably determined in accordance with a structure, a material and the like of the honeycomb structure to be prepared.

To form the ceramic forming raw material, first, the ceramic forming raw material is kneaded to obtain a kneaded material, and the obtained kneaded material is preferably formed into a honeycomb form. There is not any special restriction on a method of kneading the ceramic forming raw material to form the kneaded material, and an example of the method is a method using a kneader, a vacuum clay kneader or the like. There is not any special restriction on a method of forming the kneaded material to obtain the formed honeycomb body, and a known forming method such as the extrusion forming or injection forming can be used. A preferable example of the method is a method of extrusion-forming the material by use of "a die" from which the formed honeycomb body having a desirable cell shape, partition wall thickness or cell density is formed, to obtain the formed honeycomb body. As a material of the die, a cemented carbide which does not easily wear down is preferable.

Examples of a shape of the formed honeycomb body include a columnar shape, an elliptic shape, and a tubular shape in which end surfaces have a polygonal shape such as "a square shape, a rectangular shape, a triangular shape, a pentangular shape, a hexagonal shape, or an octagonal shape".

Moreover, after the above forming, the obtained formed honeycomb body may be dried. There is not any special restriction on a drying method. Examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed.

(2-1-2) Firing Step;

Next, the formed honeycomb body is fired to prepare the fired honeycomb body.

Prior to the firing (final firing) of the formed honeycomb body, the formed honeycomb body is preferably calcinated. The calcinating is performed for degreasing. There is not any special restriction on a method of calcinating the formed honeycomb body, as long as organic substances (the organic binder, the surfactant, the pore former, etc.) can be removed. In general, a burning temperature of the organic binder is from about 100 to 300° C. and a burning temperature of the pore former is from about 200 to 800° C. Therefore, as calcinating conditions, heating is preferably performed at about 200 to 1000° C. in an oxidation atmosphere for about three to 100 hours.

The firing (the final firing) of the formed honeycomb body is performed so as to sinter and densify the forming raw material constituting the calcinated formed honeycomb body, thereby acquiring a predetermined strength. Firing conditions (temperature, time, atmosphere, etc.) vary in accordance with the type of the forming raw material, and hence suitable conditions may be selected in accordance with the type thereof. For example, when the cordierite forming raw material is used, the firing temperature is preferably from 1410 to 1440° C. Moreover, the firing time is preferably from four to eight hours, as time to keep the highest temperature. There is not any special restriction on a device which performs the calcinating and the final firing, but an electric furnace, a gas furnace or the like can be used.

(2-2) Cutting Step;

The cutting step is a step of cutting the outer peripheral portion of the fired honeycomb body to form the flange section. The outer periphery of the fired honeycomb body is cut, to create shapes of the honeycomb base material and the flange section. That is, "the formed honeycomb body formed in a state where the forming raw material is continuously connected" is prepared by the extrusion forming, and the fired honeycomb body obtained by firing the formed honeycomb body is cut and processed to form the honeycomb base material and the flange section. Therefore, the partition walls and the flange partition walls are continuously connected without forming any boundaries therein.

There is not any special restriction on a method of cutting the fired honeycomb body. As the method of cutting the outer peripheral portion of the fired honeycomb body, a heretofore known method can suitably be employed, but a technique of pressing a grindstone sprinkled with diamond while rotating the fired honeycomb body is preferable. A thickness of "the outer peripheral portion of the fired honeycomb body which is to be cut" in the cutting step is the same as a thickness of the flange section formed after the cutting.

It is to be noted that the cutting may be performed before or after the firing of the formed honeycomb body, but the cutting is preferably performed after the firing. The cutting is performed after the firing, whereby even when the fired honeycomb body is deformed by the firing, the shape of the fired honeycomb body can be arranged by the cutting.

(2-3) Plugging Step;

When the fired honeycomb body including plugging portions is prepared, the following plugging step is preferably performed after the cutting step. In this plugging step, plugging portions are disposed in open frontal areas of "predetermined cells" in one end surface and open frontal areas of "the remaining cells" in the other end surface of the fired honeycomb body. The step will specifically be described in the following.

First, the plugging material is filled into the cell open frontal areas of the one end surface of the fired honeycomb body (the honeycomb base material). As the method of filling the plugging material into the cell open frontal areas of the one end surface, a method having a masking step and a press-in step is preferable. The masking step is a step of attaching a sheet to the one end surface of the fired honeycomb body, and making holes at positions of the sheet which overlap with "cells to be provided with the plugging portions". The press-in step is a step of pressing "an end of the fired honeycomb body to which the sheet is attached" into a container which contains the plugging material, to press the plugging material into the cells of the fired honeycomb body. When the plugging material is pressed into the cells of the fired honeycomb body, the plugging material passes through the holes made in the sheet, and is filled into the only cells that communicate with the holes made in the sheet.

The plugging material can be prepared by suitably mixing raw materials which are examples of constituent elements of the above ceramic forming raw material. The ceramic raw material contained in the plugging material is preferably the same as the ceramic raw material for use as the raw material of the partition walls.

Next, the plugging material filled into the fired honeycomb body is preferably dried.

In the one end surface of the fired honeycomb body, the cells provided with the plugging portions and the cells which are not provided with any plugging portions are preferably alternately arranged. In this case, in the one end surface in which the plugging portions are formed, the checkered pattern is formed by the plugging portions and "the open frontal areas of the cells".

Next, the plugging portions are preferably disposed in the open frontal areas of "the remaining cells" in the other end surface of the fired honeycomb body in the same manner as in the one end surface. It is to be noted that the drying of the plugging material may be performed after the plugging material is filled into both the end surfaces of the fired honeycomb body. Moreover, the firing step may be performed after the plugging material is filled into the formed honeycomb body.

(2-4) Outer Periphery Coating Wall Forming Step;

To the outer periphery of the cut fired honeycomb body (the side surface of the honeycomb base material and the surface of the flange section), an outer periphery coating material is preferably applied, to form the outer periphery coating wall, thereby preparing the dust collecting honeycomb filter. The outer periphery coating wall is formed, which can prevent the flange section from being chipped. An example of the outer periphery coating material is a material obtained by adding additives such as an organic binder, resin balloons and a dispersant to an inorganic raw material such as inorganic fiber, colloidal silica, clay or SiC particles or the same material as the plugging material and further adding water, followed by kneading. An example of a method of applying the outer periphery coating material is a coating method by a rubber spatula or the like while rotating "the cut fired honeycomb body" on a lathe.

Moreover, after applying the outer periphery coating material, the outer periphery coating material applied onto the open frontal areas of the flange cells of the flange section is preferably pressed by using the spatula or the like, to push the material into the open frontal areas of the flange cells, thereby forming the flange plugging portions. In this case, the outer periphery coating material is preferably thickly applied onto the end surface of the flange section (the end surface in the extending direction of the flange cells) as much as the material pushed into the open frontal areas of the flange cells. At this time, the thickness of the coating material to be applied to the end surface of the flange section and a size of the pressing by the spatula or the like are regulated, whereby a length of the flange plugging portion (the length in the extending direction of the flange cells) can be regulated.

Figure 8:
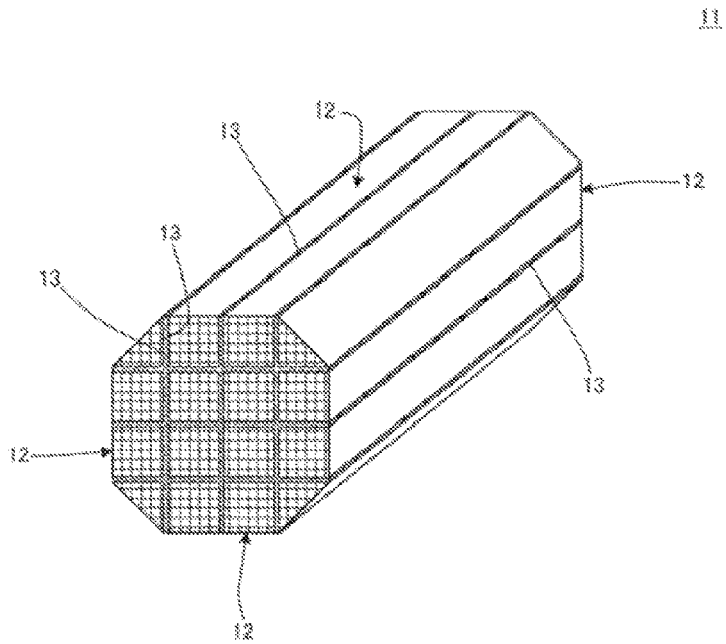
FIG. 8 is a perspective view schematically showing a joined honeycomb segment assembly prepared in a manufacturing process in a method of manufacturing the dust collecting honeycomb filter of the present invention.

When the dust collecting honeycomb filter of the present invention is the segment type dust collecting honeycomb filter 400 as shown in FIG. 7, the dust collecting honeycomb filter is preferably prepared as follows. First, a plurality of fired honeycomb segment bodies are prepared, and as shown in FIG. 8, a plurality of obtained fired honeycomb segment bodies 12 are preferably joined by a joining material 13, to obtain a joined honeycomb segment assembly 11. Then, an outer periphery of the joined honeycomb segment assembly 11 is preferably cut and processed to form the honeycomb base material and the flange section, and the plugging portions are preferably formed to prepare the dust collecting honeycomb filter. Moreover, the outer periphery coating material is applied to the joined honeycomb segment assembly subjected to the cut processing and provided with the plugging portions to form an outer periphery coating wall, thereby obtaining the dust collecting honeycomb filter in another preferable configuration. Furthermore, after applying the outer periphery coating material, the outer periphery coating material applied onto the open frontal areas of the flange cells of the flange section is preferably pushed into the open frontal areas of the flange cells, to form the flange plugging portions. FIG. 8 is a perspective view schematically showing the joined honeycomb segment assembly prepared in a manufacturing process in the manufacturing method of the dust collecting honeycomb filter of the present invention.

The fired honeycomb segment bodies can be prepared by the above-mentioned preparing method of "the fired honeycomb body". Moreover, there is not any special restriction on a material of the joining material 13, but a slurry or the like is preferable which is obtained by adding an organic binder, resin balloons, a dispersant and the like to inorganic fiber, colloidal silica, clay, or ceramic particles such as SiC particles or cordierite particles, and further adding water, followed by kneading.

EXAMPLES

Hereinafter, the present invention will further specifically be described with respect to examples. The present invention is not limited to these examples.

Example 1

As a ceramic raw material, a cordierite forming raw material was used to prepare a dust collecting honeycomb filter. First, to 100 parts by mass of the cordierite forming raw material, 25 parts by mass of water as a dispersion medium, 10 parts by mass of cokes as a pore former and 5 parts by mass of an organic binder were added, to obtain a forming raw material. As the cordierite forming raw materials, silica, talc and alumina were used. As the organic binder, methylcellulose was used. Then, the forming raw materials were mixed and kneaded to prepare a columnar kneaded material. As a mixing device, Loedige mixer was used, and as a kneading device, a kneader and a vacuum clay kneader were used.

The obtained kneaded material was extrusion-formed, to obtain a columnar formed honeycomb body. The obtained formed honeycomb body was dried with microwaves.

The dried formed honeycomb body was fired on conditions of the highest temperature of 1420° C. and 100 hours to obtain a fired honeycomb body.

Next, an outer peripheral portion of the obtained columnar fired honeycomb body was cut so that a honeycomb base material and a flange section were formed. In this way, the honeycomb base material and the flange section were formed. A method of cutting the outer peripheral portion of the fired honeycomb body was a method of pressing a grindstone sprinkled with diamond onto the outer peripheral portion of the fired honeycomb body while rotating the fired honeycomb body.

As to the obtained honeycomb base material of the fired honeycomb body, plugging portions were formed at one end of each predetermined cell and the other end of each remaining cell. Additionally, the predetermined cells and the remaining cells were arranged alternately (by turns), so that checkered patterns were formed in both end surfaces by open frontal areas of the cells and the plugging portions. As a plugging filling material, raw materials similar to those of the fired honeycomb body were used.

Afterward, an outer periphery coating material was applied to the outer periphery of the cut fired honeycomb body (the side surface of the honeycomb base material and the surface of the flange section) to form an outer periphery coating wall, thereby obtaining the dust collecting honeycomb filter. When the outer periphery coating wall was formed, the end surface of the flange section was pushed with a spatula, to push the outer periphery coating material into flange cells, thereby forming flange plugging portions.

The obtained honeycomb base material of the dust collecting honeycomb filter had a columnar shape in which a diameter of the honeycomb base material in a cross section perpendicular to a cell extending direction was 160 mm, and a length thereof in the cell extending direction was 210 mm. Moreover, a distance (a position where the flange section was formed on the basis of one end surface of the honeycomb base material) X between one end surface of the honeycomb base material and the end surface of the flange section which faced the same direction as the one end surface of the honeycomb base material was 65 mm. A length (a width of the flange section) L of the flange section in the extending direction of the flange cells was 20 mm. A thickness (a thickness of the flange section; a length in a diametric direction) H (see FIG. 3) of a flange section 23 in the cross section perpendicular to the cell extending direction was 10 mm. Moreover, both a partition wall thickness and a flange partition wall thickness were 180 μm. Furthermore, both a cell density and a flange cell density were 62 cells/cm². Additionally, a length of each plugging portion formed in the honeycomb base material in the cell extending direction was 2.5 mm. Moreover, a shape of the cross section of each cell of the honeycomb base material which was perpendicular to the cell extending direction was a square shape. Furthermore, a length ("a plugging portion thickness" of "a flange outer peripheral portion"), in the extending direction of the flange cells, of the flange plugging portion positioned on the outermost side in the flange section was 3.0 mm. Additionally, a length ("a plugging portion thickness" of "a flange inner peripheral portion"), in the extending direction of the flange cells, of the flange plugging portion positioned on the innermost side in the flange section was 1.0 mm. Moreover, the length of the flange plugging portion in the flange section "in the extending direction of the flange cells" was larger close to the flange outer peripheral portion. Furthermore, the partition walls and flange partition walls were continuously connected without forming any boundaries therein. It is to be noted that when the end of the flange section is tapered, the distance X is a distance between one end surface of the honeycomb base material and an intersection of "the end surface of the flange section" on the side of "the one end surface of the honeycomb base material" and the outer periphery of the honeycomb base material, as shown in FIG. 9.

As to the obtained dust collecting honeycomb filter, "a soot mass limit test" and "a collision test" were carried out by a method described in the following. The results are shown in Table 1.

In Table 1, a column of "H" indicates a thickness (mm) of the flange section 23 in the cross section perpendicular to the cell extending direction. A column of "L" indicates a length (mm) of the flange section in the extending direction of the flange cells. A column of "α" indicates a tilt angle (°) of the end surface of the flange section. α was the same angle on both one end surface side and the other end surface side of the honeycomb base material, but may be a different angle. Moreover, in a column of "the flange outer peripheral portion" of "the plugging portion thickness", "(total length)" described next to a numeric value means that the plugging portions are disposed (packed) over the total length of each flange cell in "the flange outer peripheral portion". That is, it is meant that each of thicknesses of the plugging portions formed at both ends of each flange cell of "the flange outer peripheral portion" (both ends in the extending direction of the flange cells) is a thickness of 0.5 time as much as a length of "the flange outer peripheral portion". Moreover, it is meant that the plugging portions at both the ends of each flange cell of "the flange outer peripheral portion" are connected in the flange cell.

(Soot Mass Limit Test)

An operation of depositing soot in the dust collecting honeycomb filter and recovering the filter (burning the soot) was repeatedly carried out while increasing an amount of the soot to be deposited, and the soot amount at which cracks were generated was confirmed. First, a non-thermal expandable mat made of a ceramic material was wound as a holding material around the outer periphery of the obtained dust collecting honeycomb filter, and the filter was pushed into a canning can member made of a stainless steel (SUS409), to obtain a canning structure. Afterward, a burning gas including soot generated by burning a diesel fuel (light oil) was allowed to flow into the dust collecting honeycomb filter from one end surface and flow out from the other end surface, whereby the soot was deposited on the dust collecting honeycomb filter. Then, cooling was once performed down to room temperature (25° C.). Afterward, from the above one end surface of the dust collecting honeycomb filter, the burning gas of 680° C. was allowed to flow into the filter to burn the soot. Then, when the soot was burned to lower a pressure loss of the dust collecting honeycomb filter, a flow rate of the burning gas was decreased, to rapidly burn the soot. Afterward, the presence/absence of the generation of the cracks in the dust collecting honeycomb filter was confirmed. This test was started, when the amount of the soot to be deposited was 4 g per liter of a volume of a honeycomb structure (4 g/liter), and the test was repeatedly carried out by increasing the soot every 0.5 (g/liter) until the generation of the cracks was recognized. The soot amount (g/liter) at the generation of the cracks was a soot mass limit (SML). Five dust collecting honeycomb filters were prepared for each of examples and comparative examples, and an average value of the five (N=5) measurement results was a value of the SML. In a column of "the soot mass limit test" of Table 1, "A" means that for the SML of a reference honeycomb filter, the SML increases, or decreases as much as a decrease amount smaller than 0.5 (g/liter). Moreover, "B" means that for the SML of the reference honeycomb filter, the SML decreases as much as a decrease amount of 0.5 (g/liter) or more. "The reference honeycomb filter" means a dust collecting honeycomb filter of a structure in which the flange section is removed from the dust collecting honeycomb filter as an object of the soot mass limit test. Data of the soot mass limit test of "the reference honeycomb filter" is taken beforehand.

(Collision Test)

Another filter that is the same as the dust collecting honeycomb filter as an object of a collision test is prepared. Then, two dust collecting honeycomb filters of the same structure are allowed to collide with each other to confirm the presence/absence of the generation of chips and cracks. The collision of the dust collecting honeycomb filter is performed as follows. First, there are prepared "a still standing roller conveyor" which allows the dust collecting honeycomb filter to stand still, and "a roller conveyor for transfer" disposed so that the dust collecting honeycomb filter can be transferred onto the "still standing roller conveyor". Then, the one dust collecting honeycomb filter is allowed to stand still on "the still standing roller conveyor". At this time, a distance from the dust collecting honeycomb filter on "the still standing roller conveyor" to one end of "the roller conveyor for transfer" is 50 cm. Then, the other dust collecting honeycomb filter is disposed at a position which is 150 cm apart from the above "one end" of "the roller conveyor for transfer" (the end on the side of "the still standing roller conveyor"). Then, "the roller conveyor for transfer" is tilted, to move the dust collecting honeycomb filter disposed on "the roller conveyor for transfer", so that the filter collides with the dust collecting honeycomb filter allowed to stand still on "the still standing roller conveyor". At this time, the tilt of "the roller conveyor for transfer" is regulated so that the dust collecting honeycomb filters collide with each other at 1.5 m/second. Moreover, the two dust collecting honeycomb filters collide on "the still standing roller conveyor" in a state where a central axis is parallel (a state where the end surfaces are parallel to each other). Collision portions of the two dust collecting honeycomb filters are flange sections. In a column of "the collision test" of Table 1, "A" means that there is not any damage on the dust collecting honeycomb filter. It is to be noted that a case where a hit trace can visually be recognized but any chips or cracks are not generated corresponds to "A". Moreover, "B" means that the chips and/or the cracks are generated in the flange section. Here, "the chips" mean that broken pieces are detached due to damage (or a state where the pieces can be detached). Moreover, "the cracks" mean that the flange section is cracked.

TABLE 1

| | Length of plugging portion (mm) | | | | | | |
| --- | --- | --- | --- | --- | --- | --- | --- |
| | Flange inner peripheral portion | Flange outer peripheral portion | H (mm) | L (mm) | α (° C.) | Soot mass limit test | Collision test |
| Example 1 | 1.0 | 3.0 | 10 | 20 | 0 | A | A |
| Example 2 | 2.5 | 3.0 | | | | A | A |
| Example 3 | 1.0 | 3.0 | | | 20 | A | A |
| Example 4 | 1.5 | 3.0 | | | | A | A |
| Example 5 | 2.0 | 3.0 | | | | A | A |
| Example 6 | 2.5 | 3.0 | | | | A | A |
| Example 7 | 1.0 | 5.0 | | | | A | A |
| Example 8 | 1.0 | 7.0 | | | | A | A |
| Example 9 | 2.5 | 5.0 | | | | A | A |
| Example 10 | 2.5 | 7.0 | | | | A | A |
| Example 11 | 2.0 | 9.0 | | | | A | A |
| Example 12 | 1.0 | 10.0 (total length) | | | | A | A |
| Example 13 | 2.5 | 10.0 (total length) | | | | A | A |
| Example 14 | 1.0 | 3.0 | 10 | | | A | A |
| Example 15 | 1.0 | 5.0 (total length) | | | | A | A |
| Example 16 | 1.0 | 3.0 | | 20 | 40 | A | A |

TABLE 1-continued

| | Length of plugging portion (mm) | | | | | | |
|---|---|---|---|---|---|---|---|
| | Flange inner peripheral portion | Flange outer peripheral portion | H (mm) | L (mm) | α (° C.) | Soot mass limit test | Collision test |
| Example 17 | 2.5 | 7.0 | | | | A | A |
| Example 18 | 1.0 | 3.0 | | | 60 | A | A |
| Example 19 | 2.5 | 7.0 | | | | A | A |
| Example 20 | 1.0 | 3.0 | 5 | 10 | 20 | A | A |
| Example 21 | 2.5 | 5.0 (total length) | | | | A | A |
| Example 22 | 1.0 | 3.0 | 20 | 40 | | A | A |
| Example 23 | 2.5 | 10.0 | | | | A | A |
| Comparative Example 1 | 0.9 | 2.5 | 10 | 20 | 0 | B | B |
| Comparative Example 2 | 0.9 | 2.8 | 20 | | 20 | B | B |
| Comparative Example 3 | 0.9 | 3.0 | | | | B | A |
| Comparative Example 4 | 0.9 | 7.0 | | | | B | A |
| Comparative Example 5 | 0.9 | 10.0 (total length) | | | | B | A |
| Comparative Example 6 | 1.0 | 2.5 | | | | A | B |
| Comparative Example 7 | 2.5 | 2.8 | | | | A | B |
| Comparative Example 8 | 2.7 | 2.8 | | | | B | B |
| Comparative Example 9 | 2.7 | 3.0 | | | | B | A |
| Comparative Example 10 | 2.7 | 7.0 | | | | B | A |
| Comparative Example 11 | 3.0 | 3.0 | 20 | 40 | | B | A |

Examples 2 to 23 and Comparative Examples 1 to 11

Dust collecting honeycomb filters were obtained in the same manner as in Example 1 except that conditions were changed as shown in Table 1. A tilt angle α of a flange section of each dust collecting honeycomb filter other than "Example 2 and Comparative Example 1" was a value in excess of 0°. It is to be noted that the tilt angle α is an angle obtained by subtracting 90° from "the angle θ between the end surface of the flange section 23 and the side surface of the honeycomb base material 3" as shown in FIG. 9. FIG. 9 showing a dust collecting honeycomb filter 500 is a front view schematically showing the dust collecting honeycomb filter of Example 3. As to the obtained dust collecting honeycomb filters, "the soot mass limit test" and "the collision test" were carried out by the above methods. The results are shown in Table 1.

Example 24

To obtain a ceramic raw material, 80 parts by mass of SiC powder and 20 parts by mass of metal Si powder were mixed. To the obtained ceramic raw material, a pore former, a binder, a surfactant and water were added, to prepare a kneaded material. As the pore former, starch was used. Moreover, as the binder, methylcellulose and hydroxypropoxyl methylcellulose were used. As the surfactant, sodium laurate was used. Amounts of the respective raw materials to be added were 5 parts by mass of the pore former, 3 parts by mass of methylcellulose, 3 parts by mass of hydroxypropoxyl methylcellulose, 1 part by mass of the surfactant, and 32 parts by mass of water, to 100 parts by mass of the ceramic raw material. An obtained kneaded material was extrusion-formed by using a die for forming a formed honeycomb body, and dried by microwaves and hot air, to obtain a dried honeycomb body.

Next, the obtained dried honeycomb body was degreased at about 400° C. in the air atmosphere. Afterward, the degreased dried honeycomb body was fired at about 1450° C. in an argon inert atmosphere, to bind SiC crystal particles by Si, thereby obtaining a fired honeycomb segment body.

In the obtained fired honeycomb segment body, a cross section perpendicular to a cell extending direction was a square with one side of 50 mm, and a length in the cell extending direction was 210 mm. Moreover, in ceramic honeycomb segments, a cell density was 62 cells/cm², and a partition wall thickness was 180 μm.

By the above method, 14 fired honeycomb segment bodies were prepared. Then, each of two of the fired honeycomb segment bodies was divided into two equal portions so that it was possible to obtain two fired honeycomb segment bodies in which each cross section perpendicular to the cell extending direction had an isosceles triangular shape.

Respective side surfaces of the obtained 16 fired honeycomb segment bodies were joined to each other by a joining material, and dried, to obtain the joined honeycomb segment assembly 11 in which a shape of a cross section perpendicular to a central axis was an octagonal shape as shown in FIG. 8. As the joining material, a material obtained by adding silica fiber, an organic binder and water to alumina powder was used. Additionally, a thickness of the joining material between the segments was about 1 mm.

Next, an outer peripheral portion of each obtained columnar fired honeycomb segment body was cut so that a honeycomb base material and a flange section were formed. In this way, the honeycomb base material and the flange section were formed. A method of cutting the outer peripheral portion of the fired honeycomb segment body was a method of pressing a grindstone sprinkled with diamond onto the outer peripheral portion of the fired honeycomb segment body while rotating the fired honeycomb segment body. Each end surface of the flange section was not provided with a tilt angle.

Afterward, an outer periphery coating material was applied to the outer periphery of the cut fired honeycomb segment body (the side surface of the honeycomb base material and the surface of the flange section) to form an outer periphery coating wall, thereby obtaining a dust collecting honeycomb filter. When the outer periphery coating wall was formed, the end surface of the flange section was pressed with a spatula, to push the outer periphery coating material into flange cells, thereby forming flange plugging portions.

The honeycomb base material of the obtained dust collecting honeycomb filter had a columnar shape in which a diameter of the honeycomb base material in a cross section perpendicular to a cell extending direction was 160 mm, and a length thereof in the cell extending direction was 210 mm. Moreover, a distance (a position where the flange section was formed on the basis of one end surface of the honeycomb base material) X between one end surface of the honeycomb base material and the end surface of the flange section which faced the same direction as the one end surface of the honeycomb base material was 65 mm. A length (a width of the flange section) L (see FIG. 3) of a flange section 23 in the extending direction of the flange cells was 20 mm. A thickness (a thickness of the flange section; a length in a diametric direction) H (see FIG. 3) of the flange section 23 in the cross section perpendicular to the cell extending direction was 10 mm. Moreover, both a partition wall thickness and a flange partition wall thickness were 180 μm. Furthermore, both a cell density and a flange cell density were 62 cells/cm$^2$. Additionally, a length of each plugging portion formed in the honeycomb base material in the cell extending direction was 2.5 mm. Moreover, a shape of the cross section of each cell of the honeycomb base material which was perpendicular to the cell extending direction was a square shape. Furthermore, a length ("a plugging portion thickness" of "a flange outer peripheral portion"), in the extending direction of the flange cells, of the flange plugging portion positioned on the outermost side in the flange section was 3.0 mm. Additionally, a length ("a plugging portion thickness" of "a flange inner peripheral portion"), in the extending direction of the flange cells, of the flange plugging portion positioned on the innermost side in the flange section was 1.0 mm. Moreover, the length of the flange plugging portion in the flange section "in the extending direction of the flange cells" was larger close to the flange outer peripheral portion. Furthermore, the partition walls and flange partition walls were continuously connected without forming any boundaries therein. Moreover, when the flange section was tapered, "the length, in the extending direction of the flange cells", of the flange cell and the flange plugging portion was the shortest distance in a distance between "both the end surfaces" in the extending direction of the flange cells. Furthermore, when the flange section was tapered, the length of the flange section in the extending direction of the flange cells was the length of the flange section on the innermost side.

As to the obtained dust collecting honeycomb filter, "a soot mass limit test" and "a collision test" were carried out by methods described in the following. The results are shown in Table 2.

TABLE 2

|  | Length of plugging portion (mm) | | H (mm) | L (mm) | α (° C.) | Soot mass limit test | Collision test |
| --- | --- | --- | --- | --- | --- | --- | --- |
|  | Flange inner peripheral portion | Flange outer peripheral portion |  |  |  |  |  |
| Example 24 | 1.0 | 3.0 | 10 | 20 | 0 | A | A |
| Example 25 | 2.5 | 3.0 |  |  |  | A | A |
| Example 26 | 1.0 | 3.0 |  |  | 20 | A | A |
| Example 27 | 1.5 | 3.0 |  |  |  | A | A |
| Example 28 | 2.0 | 3.0 |  |  |  | A | A |
| Example 29 | 2.5 | 3.0 |  |  |  | A | A |
| Example 30 | 1.0 | 5.0 |  |  |  | A | A |
| Example 31 | 1.0 | 7.0 |  |  |  | A | A |
| Example 32 | 2.5 | 5.0 |  |  |  | A | A |
| Example 33 | 2.5 | 7.0 |  |  |  | A | A |
| Example 34 | 2.0 | 9.0 |  |  |  | A | A |
| Example 35 | 1.0 | 10.0 (total length) |  |  |  | A | A |
| Example 36 | 2.5 | 10.0 (total length) |  |  |  | A | A |
| Example 37 | 1.0 | 3.0 |  | 10 |  | A | A |
| Example 38 | 1.0 | 5.0 (total length) |  |  |  | A | A |
| Example 39 | 1.0 | 3.0 |  | 20 | 40 | A | A |
| Example 40 | 2.5 | 7.0 |  |  |  | A | A |
| Example 41 | 1.0 | 3.0 |  |  | 60 | A | A |
| Example 42 | 2.5 | 7.0 |  |  |  | A | A |
| Example 43 | 1.0 | 3.0 | 5 | 10 | 20 | A | A |
| Example 44 | 2.5 | 5.0 (total length) |  |  |  | A | A |
| Example 45 | 1.0 | 3.0 | 20 | 40 |  | A | A |
| Example 46 | 2.5 | 10.0 |  |  |  | A | A |
| Comparative Example 12 | 0.9 | 2.5 | 10 | 20 | 0 | B | B |
| Comparative Example 13 | 0.9 | 2.8 | 20 |  | 20 | B | B |
| Comparative Example 14 | 0.9 | 3.0 |  |  |  | B | A |
| Comparative Example 15 | 0.9 | 7.0 |  |  |  | B | A |
| Comparative | 0.9 | 10.0 (total length) |  |  |  | B | A |

TABLE 2-continued

| | Length of plugging portion (mm) | | | | | | |
|---|---|---|---|---|---|---|---|
| | Flange inner peripheral portion | Flange outer peripheral portion | H (mm) | L (mm) | α (° C.) | Soot mass limit test | Collision test |
| Example 16 | | | | | | | |
| Comparative Example 17 | 1.0 | 2.5 | | | | A | B |
| Comparative Example 18 | 2.5 | 2.8 | | | | A | B |
| Comparative Example 19 | 2.7 | 2.8 | | | | B | B |
| Comparative Example 20 | 2.7 | 3.0 | | | | B | A |
| Comparative Example 21 | 2.7 | 7.0 | | | | B | A |
| Comparative Example 22 | 3.0 | 3.0 | 20 | 40 | | B | A |

Examples 25 to 46 and Comparative Examples 12 to 22

Figure 10:
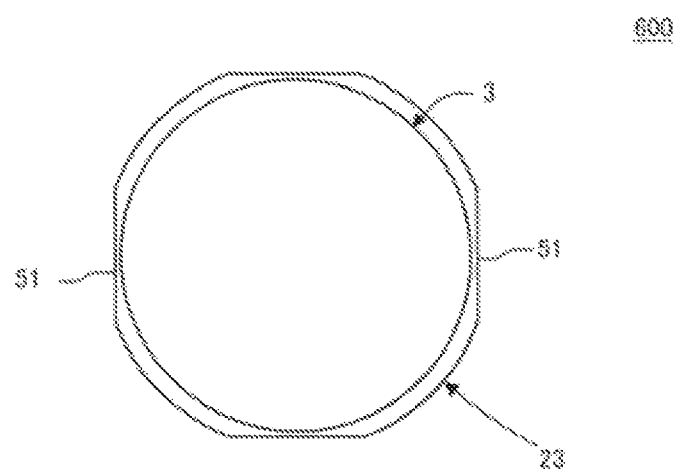
FIG. 10 is a plan view schematically showing a dust collecting honeycomb filter of Example 45.

Dust collecting honeycomb filters were obtained in the same manner as in Example 24 except that conditions were changed as shown in Table 2. As to the dust collecting honeycomb filter of Example 45, as shown in FIG. 10, planar flat surface portions 51 parallel to a cell extending direction were formed in a flange section 23. The four flat surface portions 51 were formed, and two pairs of flat surface portions 51 parallel to each other in one pair (two) were formed. An angle formed by one "pair of flat surface portions 51" and the other "pair of flat surface portions 51" was 90°. That is, in a cross section perpendicular to the cell extending direction, the flat surface portion 51 was formed every 90° in an outer peripheral direction (a rotating direction around a central axis). Moreover, a distance between the flat surface portion 51 and a honeycomb base material 3 was 10 mm. It can be considered that "the distance between the flat surface portion 51 and the honeycomb base material 3" is "a thickness of the flange section 23 in the flat surface portion 51". In a dust collecting honeycomb filter 600 shown in FIG. 10, partition walls and cells of the honeycomb base material 3 are omitted. FIG. 10 is a plan view schematically showing the dust collecting honeycomb filter 600 of Example 45. Moreover, also as to each of the dust collecting honeycomb filters of Example 46 and Comparative Examples 13 and 20, there were formed four flat surface portions similar to those of the dust collecting honeycomb filter 600 of Example 45.

As to the obtained dust collecting honeycomb filters, "a soot mass limit test" and "a collision test" were carried out by the above methods. The results are shown in Table 2.

From Table 1, it is seen that in the dust collecting honeycomb filters of Examples 1 to 23, each flange section is not easily damaged during collision, as compared with the dust collecting honeycomb filters of Comparative Examples 1, 2 and 6 to 8. Moreover, it is seen that in the dust collecting honeycomb filters of Examples 1 to 23, generation of cracks of a root portion of each flange section due to "heat shock during recovery" is suppressed during use as a DPF, as compared with the dust collecting honeycomb filters of Comparative Examples 1 to 5 and 8 to 11.

Moreover, from Table 2, it is seen that in the dust collecting honeycomb filters of Examples 24 to 46, each flange section is not easily damaged during collision, as compared with the dust collecting honeycomb filters of Comparative Examples 12, 13 and 17 to 19. Moreover, it is seen that in the dust collecting honeycomb filters of Examples 24 to 46, generation of cracks of a root portion of each flange section due to "heat shock during recovery" is suppressed during use as a DPF, as compared with the dust collecting honeycomb filters of Comparative Examples 12 to 16 and 19 to 22. From these results, it is seen that in both a segment type dust collecting honeycomb filter and a dust collecting honeycomb filter prepared from one formed honeycomb body (the dust collecting honeycomb filter which does not have any joining portions), similar evaluation results can be obtained.

Industrial Applicability

A dust collecting honeycomb filter of the present invention can suitably be utilized as a filter element of a dust collecting device.

Description of Reference Numerals

1: partition wall, 2: cell, 3: honeycomb base material, 4: outer periphery, 5: plugging portion, 6: outer periphery coating wall, 11: joined honeycomb segment assembly, 12; fired honeycomb segment body, 13: joining material, 21: flange partition wall, 22: flange cell, 23: flange section. 24: flange plugging portion, 24a: flange plugging portion positioned on the innermost side, 24b: flange plugging portion positioned on the outermost side. 25: end surface of the flange section, 26: R-form corner, 27: curved skirt portion, 28: linear corner, 29: linear skirt portion. 32: honeycomb segment base material, 33: honeycomb base material, 35: honeycomb segment, 36: joining material, 42: flange segment, 43: flange section, 51: flat surface portion, 100, 200, 300, 400, 500 and 600: dust collecting honeycomb filter, D1: cell extending direction (of the honeycomb base material), D2: extending direction of the flange cells, θ: angle, H: thickness of the flange section. L: width of the flange section, and X: distance.

The invention claimed is:

1. A dust collecting honeycomb filter comprising a honeycomb base material having porous partition walls to define and form a plurality of cells that become through channels of a fluid, and a flange section disposed on an outer periphery of the honeycomb base material and having porous flange partition walls to define and form a plurality of flange cells,
   wherein an extending direction of the cells of the honeycomb base material and an extending direction of the flange cells are the same direction,
   the flange section is formed so as to project outwardly from the outer periphery of the honeycomb base material, the partition walls and the flange partition walls are continuously connected without forming any boundaries therein, the flange section has flange plugging portions disposed in open frontal areas of the flange cells in both end surfaces in the extending direction of the flange cells, and a length, in the extending direction of the flange cells, of the flange plugging portion positioned on the innermost side in the flange section is from 1.0 to 2.5 mm, and a length, in the extending direction of the flange cells, of the flange plugging portion positioned on the outermost side in the flange section is 3.0 mm or more.

2. The dust collecting honeycomb filter according to claim 1, wherein a length, in the extending direction of the flange cells, of the flange plugging portion positioned on the outermost side in the flange section is 3.0 mm to 7.0 mm.

3. The dust collecting honeycomb filter according to claim 1, wherein as to the length of the flange plugging portion in the extending direction of the flange cells, the flange plugging portion positioned on an inner side in the flange section is shorter.

4. The dust collecting honeycomb filter according to claim 2, wherein as to the length of the flange plugging portion in the extending direction of the flange cells, the flange plugging portion positioned on an inner side in the flange section is shorter.

5. The dust collecting honeycomb filter according to claim 1, wherein the honeycomb base material has the plugging portions disposed in open frontal areas of at least a part of the cells.

6. The dust collecting honeycomb filter according to claim 2, wherein the honeycomb base material has the plugging portions disposed in open frontal areas of at least a part of the cells.

7. The dust collecting honeycomb filter according to claim 3, wherein the honeycomb base material has the plugging portions disposed in open frontal areas of at least a part of the cells.

8. The dust collecting honeycomb filter according to claim 1, wherein the outer periphery of the honeycomb base material and a surface of the flange section comprise an outer periphery coating wall.

9. The dust collecting honeycomb filter according to claim 2, wherein the outer periphery of the honeycomb base material and a surface of the flange section comprise an outer periphery coating wall.

10. The dust collecting honeycomb filter according to claim 3, wherein the outer periphery of the honeycomb base material and a surface of the flange section comprise an outer periphery coating wall.

11. The dust collecting honeycomb filter according to claim 4, wherein the outer periphery of the honeycomb base material and a surface of the flange section comprise an outer periphery coating wall.

12. The dust collecting honeycomb filter according to claim 8, wherein a material of the outer periphery coating wall and a material of the flange plugging portions are the same material.

13. The dust collecting honeycomb filter according to claim 9, wherein a material of the outer periphery coating wall and a material of the flange plugging portions are the same material.

14. The dust collecting honeycomb filter according to claim 10, wherein a material of the outer periphery coating wall and a material of the flange plugging portions are the same material.

15. The dust collecting honeycomb filter according to claim 11, wherein a material of the outer periphery coating wall and a material of the flange plugging portions are the same material.

* * * * *